June 25, 1957 C. C. POWELL 2,797,013
WIRE BASKET AND MANUFACTURE THEREOF
Filed May 8, 1956 2 Sheets-Sheet 1

INVENTOR.
Charles C. Powell
BY Frease & Bishop
ATTORNEYS

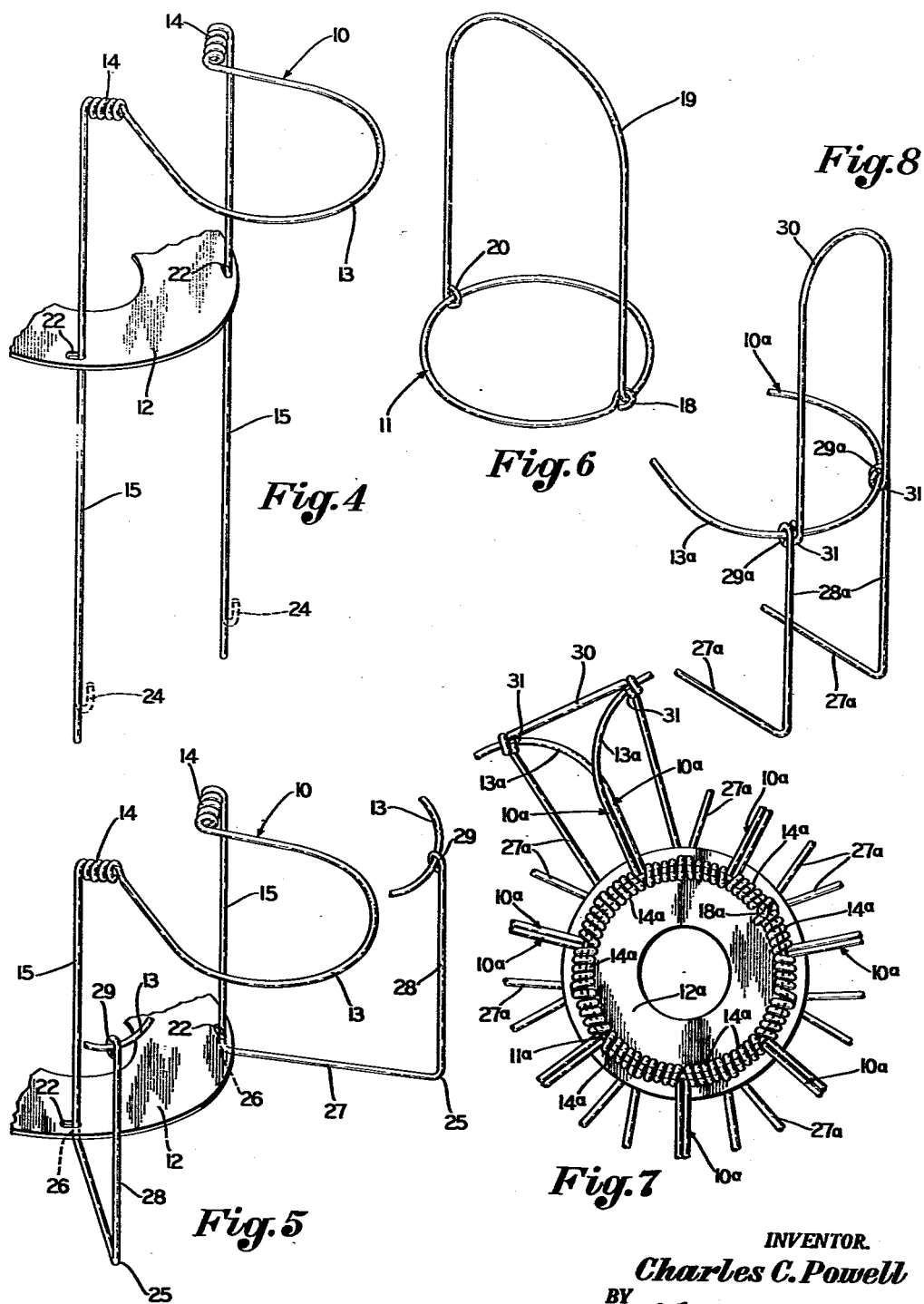

United States Patent Office 2,797,013
Patented June 25, 1957

2,797,013

WIRE BASKET AND MANUFACTURE THEREOF

Charles C. Powell, Massillon, Ohio

Application May 8, 1956, Serial No. 583,495

12 Claims. (Cl. 220—19)

The invention relates to wire baskets, and more particularly to a strong, rigid, construction of wire basket which is formed and assembled without the use of welds or soldered joints.

Aluminum wire has been found to be an ideal material for the formation of wire baskets, especially those which are subjected to moisture in use, such for instance as baskets for sterilizing nursing bottles and the like, because of the resistance of aluminum to rust and corrosion. Also, because of the comparative lightness of the weight of aluminum, and because of the strength developed therein by alloying with a small amount of other metals, aluminum wire is well adapted for such uses.

However, it has been found that aluminum wire cannot be soldered and that it is very difficult to weld it, and welded joints therein detract from the appearance of the finished article.

There are also other forms of wire such as plated, coated, anodized metal wire and the like which may be used for such purposes, but which it is not practical to solder or weld.

The present invention concerns the manufacture of baskets formed of aluminum wire and the like, in which a strong, durable, rigid basket is formed without the use of welding or soldering.

It is therefore an object of the invention to provide for the construction of wire baskets in which neither welding nor solder is required.

Another object is to provide such baskets in which all of the joints are formed by tightly clinching the several wires together.

A further object is to provide a basket of this character in which certain of the parts are formed into coils which are threaded upon a wire ring or the like, the coils not only rigidly connecting such parts to the ring, but also providing spaces for properly spacing the several parts.

A still further object is to provide such a basket in which a series of loops are located radially around a central ring and connected thereto in the manner above referred to, one side of each loop overlaying the adjacent side of the next adjacent loop on one side thereof, the other side of each loop underlaying the adjacent side of the loop on the other side thereof, so as to increase the rigidity of the basket.

Another object of the invention is to construct a wire basket of the character referred to, in which a metal disc is located below the center ring, and in which each of the loop members has straight terminal leg portions located through openings in said disc.

A further object is to provide such a wire basket in which each of the terminal leg portions of each loop member is bent below the disc and extends outwardly in substantially radially disposed position and is then bent to extend vertically upward, the terminal ends thereof being looped around and clinched upon the outer portion of another of said loop members.

The above objects together with others which will be apparent from the drawings and following description, or which may be later referred to, may be attained by constructing the improved wire basket in the manner hereinafter described in detail and illustrated in the accompanying drawings.

In general terms, the invention may be briefly described as comprising a basket constructed of a plurality of partially preformed wire members attached to a central wire ring, and to each other to produce a rigid, strong structure without the use of welds, solder or other extraneous means for joining the parts rigidly together.

Each of the partially preformed wire members comprises a single length of wire having its central portion bent into a substantially horizontal loop shape, with an outwardly disposed coil formed at each end of the loop, the adjacent end portions of the wire length terminating in straight downwardly disposed vertical legs.

A plurality of these members are located radially around a central wire ring, with one side of each loop overlaying the adjacent side of the loop on one side thereof and underlaying the adjacent side of the loop on the other side thereof. The central wire ring is threaded through the coils of the several wire loop members, and the ends of the wire ring are clinched together, holding the coils of the several loop members in closely abutting relation around the entire ring.

The straight vertical terminal legs of the several wire loop members are located through suitable apertures in a metal disc positioned at a point spaced below the wire ring. Two spaced 90 degree bends are made in each of said legs, forming a substantially radially disposed intermediate portion and upwardly disposed vertical terminal portion, the upper end of which is tightly clinched upon the outer portion of an adjacent loop member.

One end portion of the center ring may be extended and shaped to form an integral handle for the basket, the terminal end of the handle being clinched upon the ring at a point diametrically opposite to the joint in the ring. Or, if desired, separate handles may be pivotally connected to the outer portions of certain of the loops, at diametrically opposite points.

Having thus briefly described the improved wire basket and the manner in which it is constructed, reference is now made to the accompanying drawings, showing preferred embodiments of the invention, in which:

Fig. 4 is a detached perspective view of one of the partially preformed loop members, showing the manner in which the straight vertical leg portions thereof are inserted through apertures in the center disc;

Fig. 5 is a detached perspective view of one of the loop members showing the final shape thereof;

Fig. 6 is a detached perspective view of the center ring with integral rigid handle formed thereon;

Fig. 7 is a fragmentary top plan view of a portion of a slightly modified form of the improved wire basket, showing the manner of pivotally attaching a handle to one side thereof; and Fig. 8 is a fragmentary detached perspective view of a portion of a diametrically opposite loop member, showing the manner of pivotally attaching a handle to the opposite side of the basket shown in Fig. 7.

Reference is now made more particularly to the embodiment of the invention shown in Figs. 1 to 6, in which similar numerals refer to similar parts throughout.

The wire basket shown in this embodiment of the invention is made up of a plurality of wire loop members generally indicated at 10, located side by side in continuous annular arrangement and radially disposed around a wire center ring indicated generally at 11, and a center disc 12 located in the bottom portion of the basket.

Figure 1:
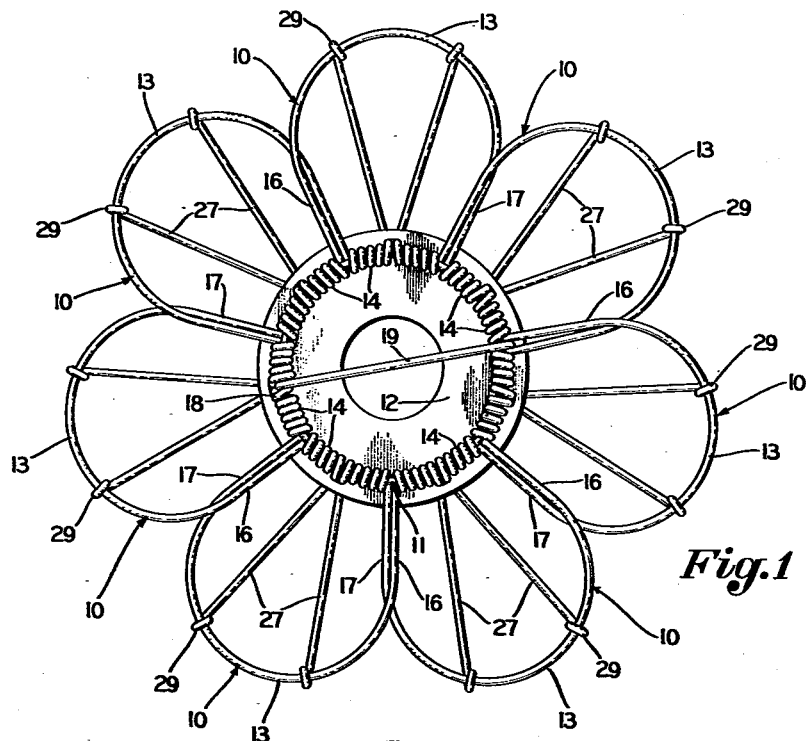
Fig. 1 is a top plan view of a wire basket embodying the invention, showing the same provided with a rigid handle formed integrally with the central ring of the basket.
Figure 2:
Fig. 2 is a side elevation of the wire basket shown in Fig. 1.

In constructing the basket shown in Figs. 1 and 2, the loop members 10 are first partially preformed in the manner shown in Fig. 4, each of these partially preformed loop members comprising the loop portion 13 with outwardly disposed coil portions 14 at each end of the loop and terminating in the downwardly disposed straight vertical leg portions 15 at the ends of the coils 14.

In assembling the several members to form the wire basket, a plurality of loop members 10 are located side by side in continuous annular arrangement and radially disposed in overlapped relation around the center ring 11. As best shown in Figs. 1 and 2, it will be seen that one side of each loop portion 13 overlays the adjacent side of the loop portion on one side thereof, as indicated at 16, while the other side thereof underlays the adjacent side of the loop portion on that side thereof, as indicated at 17.

The wire ring 11 is threaded through the coil portions of the loop members, and one end of the wire ring is then clinched upon the other end thereof, as indicated at 18 in Figs. 1 and 6, so as to hold all of the coil portions 14 in tightly abutting relation upon the ring, as shown in Fig. 1.

In cases where it is desired to provide a rigid integral handle, as shown in Figs. 1, 2 and 6, one end portion of the wire ring may be extended beyond the clinched joint 18 and formed into a handle bail 19, the terminal end of which clinched around the ring 11 at a point diametrically opposite to the joint 18, as best shown at 20 in Fig. 6.

Figure 3:
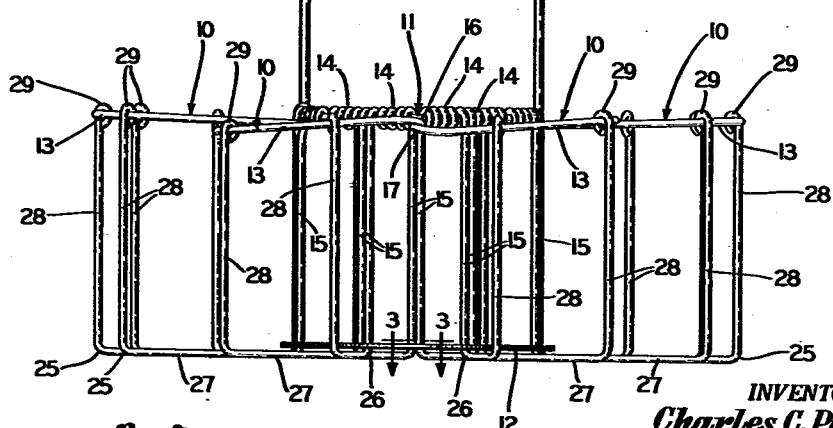
Fig. 3 is a fragmentary plan sectional view taken as on the line 3—3, Fig. 2.
Figure 3:
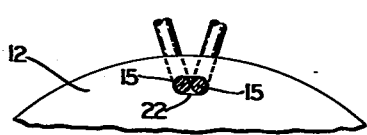

The depending straight leg portions 15 of the loop members are located through elongated apertures 22 in the sheet metal disc 12, which is centrally located at a point spaced below the center ring 11, in the manner shown in Fig. 4. Each of the apertures 22 is preferably of sufficient size to accommodate two adjacent leg portions 15, as best shown in Fig. 3.

An open hook is then formed upon the terminal lower end of each of the straight leg portions 15, as indicated in broken lines at 24 in Fig. 4. Each leg portion 15 is then bent at 90 degrees at two substantially equi-distant points, as indicated at 25 and 26, so as to provide the substantially radially disposed horizontal portion 27 and the vertical terminal portion 28, and the hook portion 24 is clinched around the adjacent loop 13 of another loop member 10, as indicated at 29 in Figs. 1, 2 and 5.

Thus a rigid, strong, durable wire basket is formed without any welds or solder at the joints, all joints being formed my merely tightly clinching the members together in the manner above described.

With such a construction it will be evident that baskets may be formed of wire composed of aluminum, or of other material such as plated, anodized or otherwise coated metal wire, which it may not be possible or commercially practical to weld or solder, although it should be understood that it is not the intention to limit the invention to the construction of baskets of such wire only, and that wire of any material may be used in constructing baskets in the manner disclosed herein.

The type of basket illustrated in the drawings, by way of example, is designed for sterilizing nursing bottles and the like. One bottle may be placed in each of the loop portions 13, the horizontal portions 27 of the legs forming a bottom support therefor, and one bottle may be placed in the center of the basket, within the annular arrangement of coils 14, the disc 12 forming a bottom support therefor. The basket, with the bottles so located therein, may be placed within any suitable receptacle in which water may be boiled to sterilize the bottles.

It should be understood, however, that the particular type of basket for sterilizing nursing bottles is shown only by way of example, and that various other designs of wire baskets may be constructed in accordance with the invention, using the principles disclosed herein, whereby all joints are formed by clinching the wire parts together rather than by welding or soldering.

Even where the wire from which the basket is constructed is formed of material which may be welded or soldered, it will be evident that by constructing a basket therefrom in the manner disclosed, a neater and more pleasing appearance is obtained by clinching the wire parts together rather than by providing welded or soldered joints which may be uneven and unsightly.

For the purpose of nesting such baskets tightly together for shipping or storage, the discs 12 may be slidably moved upward upon the vertical legs 15, into substantial contact with the annular arrangement of coils 14, and two baskets may be placed with the bottoms thereof toward each other and the horizontal portions 27 of the legs of the two baskets in staggered relation, and pushed together, so that the two baskets may be nested together, thus making it possible to store or ship a plurality of the baskets in a minimum of space.

In cases where it is desired to provide hinged or folding handles upon the basket rather than the integral rigid handle, as shown in Figs. 1 to 6, this may be accomplished in the manner shown in Figs. 7 and 8.

In constructing such a basket, the loop members 10a with loops 13a, coils 14a at the ends of the loop portions, and legs extending downward from the coil portions and having the horizontal portions 27a and vertical terminal portions 28a with their terminal ends clinched around the loop portions 13a of adjacent loop members, as indicated at 29a, may be provided in exactly the same form as illustrated and described in detail with reference to Figs. 1 to 6.

In this case, the wire ring 11a has no extension at one end for forming an integral handle bail, but is only of sufficient length to be threaded through the annular arrangement of coil portions 14a, the ends of the ring being clinched together as shown at 18a. The disc 12a is of the same construction and arrangement as the disc 12 shown in Figs. 1 to 6.

A pair of hinged or folding handles is provided, each comprising an inverted, U-shaped wire handle member 30, the terminal ends of which are provided with eyes 31 bent around certain of the loop portions 13a at diametrically opposite points upon the basket, as shown in Figs. 7 and 8, to form hinge joints.

The eyes 31 of these handle members are not clinched tightly around the corresponding loop portions 13a, but provide hinge or pivot joints by means of which the handles 30 may be folded flat against the top of the basket for storing or shipping the baskets in a minimum of space.

Although the embodiments of the invention illustrated in the drawings disclose a circular basket, it should be understood that the principles of the invention are applicable to oval, square, rectangular or other shapes of baskets. In such cases the central ring 11 would be oval, square, rectangular or of other desired shape, instead of circular, and the disc 12 would be of similar shape, and it should be understood that throughout the specification and claims, where the terms "central ring" or "central wire ring" are used, the same are not intended to limit the invention to a circular ring, but are intended to cover oval, square, rectangular or other shapes of ring.

Also, throughout the specification and claims, where the terms "disc" or "sheet metal discs" are used, the same are intended to cover sheet metal or similar plates of not only circular shape, but also oval, square, rectangular or other shapes as may be desirable for the formation of wire baskets of various shapes constructed in accordance with the invention.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. A wire basket comprising a plurality of similar wire loop members located side by side in continuous annular arrangement, each of said loop members comprising a loop portion, a coiled portion at each end of the loop portion and depending leg portions at the ends of the coiled portions, a central wire ring threaded through said coiled portions and having its meeting end portions clinched together to hold said coiled portions in closely abutting relation thereon, each leg portion having right angle bends at two spaced points forming a substantially radially disposed horizontal portion and an upright vertical terminal portion, the upper end of each vertical terminal portion being clinched around the loop portion of another of said loop members.

2. A wire basket comprising a plurality of similar wire loop members located side by side in continuous annular arrangement, each of said loop members comprising a loop portion, a coiled portion at each end of the loop portion and depending leg portions at the ends of the coiled portions, a central wire ring threaded through said coiled portions and having its meeting end portions clinched together to hold said coiled portions in closely abutting relation thereon, a disc spaced below said central ring and having apertures therein through which said leg portions are located, each leg portion having right angle bends at two spaced points forming a substantially radially disposed horizontal portion and an upright vertical terminal portion, the upper end of each vertical terminal portion being clinched around the loop portion of another of said loop members.

3. A wire basket comprising a plurality of similar wire loop members located side by side in continuous annular arrangement, each of said loop members comprising a loop portion, a coiled portion at each end of the loop portion and depending leg portions at the ends of the coiled portions, a central wire ring threaded through said coiled portions and having its meeting end portions clinched together to hold said coiled portions in closely abutting relation thereon, a disc spaced below said central ring and having apertures therein through which said leg portions are located, each of said apertures being of sufficient size to receive two of said leg portions in juxtaposition to each other, each leg portion having right angle bends at two spaced points forming a substantially radially disposed horizontal portion and an upright vertical terminal portion, the upper end of each vertical terminal portion being clinched around the loop portion of another of said loop members.

4. A wire basket comprising a plurality of similar wire loop members located side by side in continuous annular arrangement, each of said loop members comprising a loop portion, a coiled portion at each end of the loop portion and depending leg portions at the ends of the coiled portions, a central wire ring threaded through said coiled portions and having its meeting end portions clinched together to hold said coiled portions in closely abutting relation thereon, one end portion of said wire ring being extended beyond the clinched joint and formed into a handle bail with its terminal end clinched around the wire ring at a point diametrically opposite to said clinched joint, each leg portion having right angle bends at two spaced points forming a substantially radially disposed horizontal portion and an upright vertical terminal portion, the upper end of each vertical terminal portion being clinched around the loop portion of another of said loop members.

5. A wire basket comprising a plurality of similar wire loop members located side by side in continuous annular arrangement, each of said loop members comprising a loop portion, a coiled portion at each end of the loop portion and depending leg portions at the ends of the coiled portions, a central wire ring threaded through said coiled portions and having its meeting end portions clinched together to hold said coiled portions in closely abutting relation thereon, one end portion of said wire ring being extended beyond the clinched joint and formed into a handle bail with its terminal end clinched around the wire ring at a point diametrically opposite to said clinched joint, a disc spaced below said central ring and having apertures therein through which said leg portions are located, each leg portion having right angle bends at two spaced points forming a substantially radially disposed horizontal portion and an upright vertical terminal portion, the upper end of each vertical terminal portion being clinched around the loop portion of another of said loop members.

6. A wire basket comprising a plurality of similar wire loop members located side by side in continuous annular arrangement, each of said loop members comprising a loop portion, a coiled portion at each end of the loop portion and depending leg portions at the ends of the coiled portions, a central wire ring threaded through said coiled portions and having its meeting end portions clinched together to hold said coiled portions in closely abutting relation thereon, each leg portion having right angle bends at two spaced points forming a substantially radially disposed horizontal portion and an upright vertical terminal portion, the upper end of each vertical terminal portion being clinched around the loop portion of another of said loop members, and handle members pivotally connected to certain of said loop portions at diametrically opposite points on said basket.

7. The method of making a wire basket which consists in preforming a plurality of similar wire loop members, each loop member comprising a length of wire having its central portion formed into a loop with a coil at each end of the loop portion and a depending straight leg portion at the end of each coil, arranging a plurality of said wire loop members in the form of a continuous annulus with the coil portions of adjacent loop members in juxtaposition to each other, providing a wire ring and threading the ring through the coil portions of the several loop members, clinching the ends of said wire ring together to tightly clamp said coil portions thereon, bending each leg portion outwardly and upwardly at spaced points, and clinching the terminal ends of the leg portions to the loop portions of adjacent loop members.

8. The method of making a wire basket which consists in preforming a plurality of similar wire loop members, each loop member comprising a length of wire having its central portion formed into a loop with a coil at each end of the loop portion and a depending straight leg portion at the end of each coil, arranging a plurality of said wire loop members in the form of a continuous annulus with the coil portions of adjacent loop members in juxtaposition to each other, and with the loop portions of adjacent loop members in overlapping position, providing a wire ring and threading the ring through the coil portions of the several loop members, clinching the ends of said wire ring together to tightly clamp said coil portions thereon, bending each leg portion outwardly and upwardly at spaced points, and clinching the terminal ends of the leg portions to the loop portions of adjacent loop members.

9. The method of making a wire basket which consists in preforming a plurality of similar wire loop members, each loop member comprising a length of wire having its central portion formed into a loop with a coil at each end of the loop portion and a depending straight leg portion at the end of each coil, arranging a plurality of said wire loop members in the form of a continuous annulus with the coil portions of adjacent loop members in juxtaposition to each other, providing a wire ring and threading the ring through the coil portions of the several loop members, clinching the ends of said wire ring together to tightly clamp said coil portions thereon, providing a perforate disc and locating the same in position spaced below said ring, locating said depending leg portions through perforations in said disc, bending each leg portion outwardly and upwardly at spaced points, and clinching the terminal ends of the leg portions to the loop portions of adjacent loop members.

10. The method of making a wire basket which consists in preforming a plurality of similar wire loop members, each loop member comprising a length of wire having its central portion formed into a loop with a coil at each end of the loop portion and a depending straight leg portion at the end of each coil, arranging a plurality of said wire loop members in the form of a continuous annulus with the coil portions of adjacent loop members in juxtaposition to each other, and with the loop portions of adjacent loop members in overlapping position, providing a wire ring and threading the ring through the coil portions of the several loop members, clinching the ends of said wire ring together to tightly clamp said coil portions thereon, providing a perforate disc and locating the same in position spaced below said ring, locating said depending leg portions through perforations in said disc, bending each leg portion outwardly and upwardly at spaced points, and clinching the terminal ends of the leg portions to the loop portions of adjacent loop members.

11. The method of making a wire basket which consists in preforming a plurality of similar wire loop members, each loop member comprising a length of wire having its central portion formed into a loop with a coil at each end of the loop portion and a depending straight leg portion at the end of each coil, arranging a plurality of said wire loop members in the form of a continuous annulus with the coil portions of adjacent loop members in juxtaposition to each other, providing a wire ring with an extension on one end thereof and threading the ring through the coil portions of the several loop members, clinching the ends of said wire ring together to tightly clamp said coil portions thereon, forming said extension into a handle bail and clinching the end of the extension upon the ring at a point diametrically opposite to the clinched ends of the ring, bending each leg portion outwardly and upwardly at spaced points, and clinching the terminal ends of the leg portions to the loop portions of adjacent loop members.

12. The method of making a wire basket which consists in preforming a plurality of similar wire loop members, each loop member comprising a length of wire having its central portion formed into a loop with a coil at each end of the loop portion and a depending straight leg portion at the end of each coil, arranging a plurality of said wire loop members in the form of a continuous annulus with the coil portions of adjacent loop members in juxtaposition to each other, providing a wire ring and threading the ring through the coil portions of the several loop members, clinching the ends of said wire ring together to tightly clamp said coil portions thereon, bending each leg portion outwardly and upwardly at spaced points, and clinching the terminal ends of the leg portions to the loop portions of adjacent loop members, providing two substantially U-shape wire handles, and clinching the ends of said wire handles to certain of said loop portions at diametrically opposite points on the wire basket.

References Cited in the file of this patent
UNITED STATES PATENTS

| | | |
|---|---|---|
| 1,530,175 | Hatch | Mar. 17, 1925 |
| 2,152,456 | Barrie | Mar. 28, 1939 |
| 2,191,693 | Havlis | Feb. 29, 1940 |